US012393494B2

(12) United States Patent
Dickens et al.

(10) Patent No.: US 12,393,494 B2
(45) Date of Patent: Aug. 19, 2025

(54) DETERMINING RISKS IN DATA BACKUPS

(71) Applicant: International Business Machines Corporation, Armonk, NY (US)

(72) Inventors: Louie A. Dickens, Vernon, AZ (US); Tara Astigarraga, Fairport, NY (US); Maunik Patel, Tucson, AZ (US); Robert Efrain Jenkins, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 18/475,331

(22) Filed: Sep. 27, 2023

(65) Prior Publication Data

US 2025/0103441 A1  Mar. 27, 2025

(51) Int. Cl.
*G06F 11/14* (2006.01)
*H04L 9/40* (2022.01)

(52) U.S. Cl.
CPC .......... *G06F 11/1464* (2013.01); *H04L 63/08* (2013.01); *H04L 63/20* (2013.01)

(58) Field of Classification Search
CPC ....... H04L 63/20; H04L 63/08; G06F 11/1464
See application file for complete search history.

(56) References Cited

U.S. PATENT DOCUMENTS

| 10,423,782 | B2 | 9/2019 | Muttik |
| 10,810,088 | B1 | 10/2020 | Gu |
| 10,887,339 | B1 | 1/2021 | Sokolov |
| 11,244,047 | B2 | 2/2022 | Muttik |
| 2018/0173874 | A1 | 6/2018 | Muttik |
| 2020/0034532 | A1 | 1/2020 | Muttik |
| 2024/0111633 | A1* | 4/2024 | Yadav ................. G06F 11/1461 |
| 2024/0320207 | A1* | 9/2024 | Palm ................... G06F 16/2282 |
| 2024/0403170 | A1* | 12/2024 | Av ...................... G06F 11/1453 |

OTHER PUBLICATIONS

Anonymous, "Cloud Toolchain and DevOps Optimization", An IP.com Prior Art Database Technical Disclosure, Authors et al.: Disclosed Anonymously, IP.com No. IPCOM000266229D, IP.com Electronic Publication Date: Jun. 24, 2021, 7 pages.

(Continued)

*Primary Examiner* — Benjamin A Kaplan
(74) *Attorney, Agent, or Firm* — Stephen R. Yoder

(57) ABSTRACT

Embodiments of the present invention provide computer-implemented methods, computer program product, and computer systems. One or more processors, in response to receiving a request to execute a backup operation, determine that backup software targeted to perform the request includes a signature associated with training data. The one or more processors, in response to determining that the backup software targeted to perform the received request has a signature in the associated training data, executing one or more actions, wherein the one or more actions comprise one or more processors to authenticate a user and an internet protocol (IP) address originating the request. The one or more processors calculate a risk, associated with the user, based on employee information associated with the user.

20 Claims, 6 Drawing Sheets

(56) References Cited

OTHER PUBLICATIONS

Anonymous, "Enhanced Data Security within Backup Systems", An IP.com Prior Art Database Technical Disclosure, Authors et al.: Disclosed Anonymously, IP.com No. IPCOM000250429D, IP.com Electronic Publication Date: Jul. 13, 2017, 7 pages.

Anonymous, "Hybrid Cloud With Security and Compliance", Opus Interactive, provided by inventors on Aug. 31, 2023, 8 pages.

Anonymous, "IBM Targets Ransomware, Other Cyberattacks with Next-Generation Flash Storage Offerings", IBM, Feb. 8, 2022, <https://newsroom.IBM.com/2022-02-08-IBM-Targets-Ransomware,-Other-Cyberattacks-with-Next-Generation-Flash-Storage-Offerings>, 5 pages.

Anonymous, "Immutable Backups Are Crucial To Enterprise Hybrid Cloud Security", Veritas, White Paper, May 2023, 5 pages.

Anonymous, "System and Method for Automated Cloud Backup Distribution", An IP.com Prior Art Database Technical Disclosure, Authors et al.: Disclosed Anonymously, IP.com No. IPCOM000250428D, IP.com Electronic Publication Date: Jul. 13, 2017, 6 pages.

Anonymous, "System and Method of Validating Changes for Database in Multi-Cloud Environment", An IP.com Prior Art Database Technical Disclosure, Authors et al.: Disclosed Anonymously, IP.com No. IPCOM000259425D, IP.com Electronic Publication Date: Aug. 11, 2019, 5 pages.

Anonymous, "System and Method to Strategize Cloud Object Migrations", An IP.com Prior Art Database Technical Disclosure, Authors et al.: Disclosed Anonymously, IP.com No. IPCOM000271804D, IP.com Electronic Publication Date: Feb. 14, 2023, 9 pages.

Chandramouli et al., "Security Guidelines for Storage Infrastructure", NIST Special Publication 800-209, Oct. 2020, <https://doi.org/10.6028/NIST.SP.800-209>, 79 pages.

Kim et al., "Security of Data on NVMe over Fabrics, The Armored Truck Way", SNIA NSF, Live Webcast May 12, 2021, <https://www.snia.org/educational-library/security-data-nvme-over-fabrics-armored-truck-way-2021>, 34 pages.

\* cited by examiner

DETERMINING RISKS IN DATA BACKUPS

BACKGROUND

The present invention relates generally to the data security, and more particularly to data security in backups.

Typically, data security refers to protecting digital data, such as those in a database from unauthorized users. Software-based security solutions encrypt the data to protect it from unauthorized access while hardware-based security solutions prevent read and write access to data, which provides protection against tampering and unauthorized access.

A data backup often refers to a copy of computer data that is stored elsewhere so that it may be used to restore the original after a data loss event. A data loss event can be due from data deletion or corruption. Data backups can thus be used to recover data after its loss or restore data do an earlier version. A backup system thus contains at least one copy of all data considered worth saving. The data storage requirements can be large.

SUMMARY

According to an aspect of the present invention, there is provided a computer-implemented method, a computer program product, and a computer system. The computer-implemented method includes in response to receiving a request to execute a backup operation, determining that backup software targeted to perform the request includes a signature associated with training data; and in response to determining that the backup software targeted to perform the received request has a signature in the associated training data, executing one or more actions, where the one or more actions comprise: authenticating a user and an internet protocol (IP) address originating the request, and calculating a risk, associated with the user, based on employee information associated with the user.

BRIEF DESCRIPTION OF THE DRAWINGS

Preferred embodiments of the present invention will now be described, by way of example only, with reference to the following drawings, in which.

DETAILED DESCRIPTION

Figure 1:
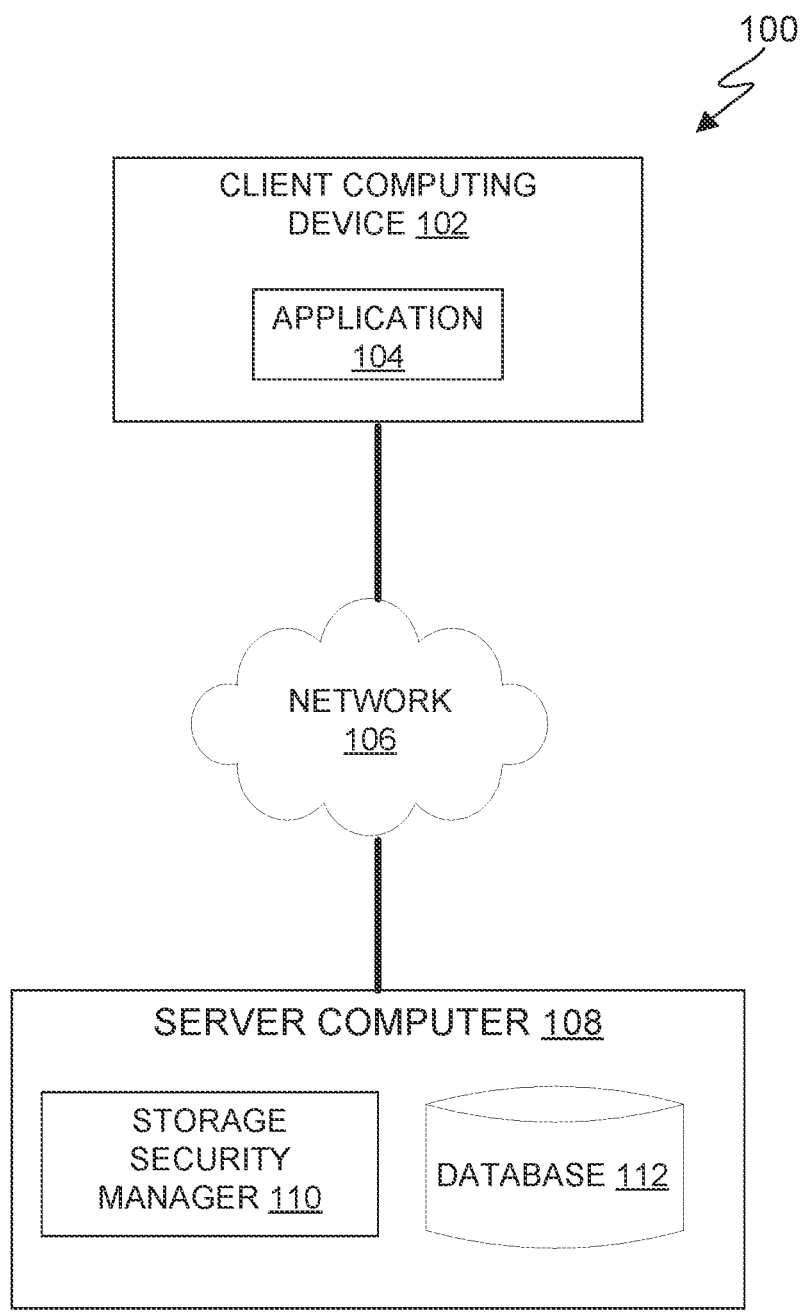
FIG. 1 depicts a block diagram of a computing environment, in accordance with an embodiment of the present invention.

According to an aspect of the invention, there is provided a computer implemented method. The computer-implemented method comprises in response to receiving a request to execute a backup operation, determining that backup software targeted to perform the request includes a signature associated with training data; and in response to determining that the backup software targeted to perform the received request has a signature in the associated training data, executing one or more actions, where the one or more actions comprise: authenticating, a user and an internet protocol (IP) address originating the request, and calculating a risk, associated with the user, based on employee information associated with the user. Such an aspect of the invention has a technical advantage of protecting storage controller vulnerabilities during back up operations by detecting and preventing backup and restore anomalies to any type of storage (e.g., Universal Serial Bus (USB), Box, USB clouds, NAS drive, cloud storage, etc.).

In embodiments, the computer-implemented can further comprise in response to the risk associated with the user meeting requirements for low risk, authorizing the request to execute the backup operation. Such an aspect of the invention has a technical advantage of adding an extra layer of security when accessing storage area network (SAN) controller.

In embodiments, the computer-implemented method of executing one or more actions can further comprise verifying that the backup operation does not violate legal policies and verifying that the backup operation does not violate cybersecurity policies. Such an aspect of the invention has a technical advantage of adding an extra layer of security when accessing storage area network (SAN) controller.

In embodiments, the computer-implemented method can include that the signature is located in one or more of locations comprising previous backups and publicly available databases. such an aspect of the invention has a technical advantage of ensuring all training data has a known signature that can be referenced for future uses.

In embodiments, the computer-implemented method can include that the employee information comprises employee user identity, employee name, employee function, previous predetermined time employee read/write access, corporate directory, and employee information. Additionally or alternatively, an embodiment in which executes one or more actions has a technical advantage of providing an additional layer of backup authentication based on employee information.

In embodiments, the computer-implemented method can include that the IP information associated with the IP address comprises internal IP structure information, internal IP low level details, employee IP specific information, and well-known corporate backup/restore IP address. Additionally or alternatively, an embodiment in which executes one or more actions has a technical advantage of providing an additional layer of backup authentication based on IP information.

In embodiments, the computer-implemented method may further comprise in response to determining that backup software targeted to perform the received request does not a signature in the associated training data, identifying known differences between a known datafile and data captured as the signature of the backup software. Additionally or alternatively, an embodiment in which executes one or more actions, has the technical effect and/or advantage of providing one or more actions that singularly or in combination authenticate a backup or restore operation with added layers of security for a storage area network controller.

According to an aspect of the invention, there is provided a computer program product. The computer program product comprises one or more computer readable storage media and program instructions stored on the one or more computer readable storage media, the program instructions comprising program instructions to, in response to receiving a request to execute a backup operation, determine that backup software targeted to perform the request includes a signature associated with training data, and program instructions to, in response to determining that the backup software targeted to perform the received request has a signature in the associated training data, execute one or more actions, where the one or more actions comprise: program instructions to authenticate a user and an internet protocol (IP) address originating the request, and program instructions to calculate a risk, associated with the user, based on employee information associated with the user. Such an aspect of the invention has a technical advantage of protecting storage controller vulnerabilities during back up operations by detecting and preventing backup and restore anomalies to any type of storage (e.g., Universal Serial Bus (USB), Box, USB clouds, NAS drive, cloud storage, etc.).

In embodiments, the computer program product can further comprise program instructions to, in response to the risk associated with the user meeting requirements for low risk, authorize the request to execute the backup operation. Such an aspect of the invention has a technical advantage of adding an extra layer of security when accessing storage area network (SAN) controller.

In embodiments, the computer program product where the program instructions to execute one or more actions can further comprise program instructions to verify that the backup operation does not violate legal policies and program instructions to verify that the backup operation does not violate cybersecurity policies. Such an aspect of the invention has a technical advantage of adding an extra layer of security when accessing storage area network (SAN) controller.

In embodiments, the computer program product can include that the signature is located in one or more of locations comprising previous backups and publicly available databases. such an aspect of the invention has a technical advantage of ensuring all training data has a known signature that can be referenced for future uses.

In embodiments, the computer program product can include that the employee information comprises employee user identity, employee name, employee function, previous predetermined time employee read/write access, corporate directory, and employee information. Additionally or alternatively, an embodiment in which executes one or more actions has a technical advantage of providing an additional layer of backup authentication based on employee information.

In embodiments, the computer program product can include that the IP information associated with the IP address comprises internal IP structure information, internal IP low level details, employee IP specific information, and well-known corporate backup/restore IP address. Additionally or alternatively, an embodiment in which executes one or more actions has a technical advantage of providing an additional layer of backup authentication based on IP information.

In embodiments, the computer program product may further comprise in response to determining that backup software targeted to perform the received request does not a signature in the associated training data, identifying known differences between a known datafile and data captured as the signature of the backup software. Additionally or alternatively, an embodiment in which executes one or more actions, has the technical effect and/or advantage of providing one or more actions that singularly or in combination authenticate a backup or restore operation with added layers of security for a storage area network controller.

According to an aspect of the invention, there is provided a computer system. The computer system comprising one or more computer processors, one or more computer readable storage media, and program instructions stored on the one or more computer readable storage media for execution by at least one of the one or more computer processors, the program instructions comprising program instructions to, in response to receiving a request to execute a backup operation, determine that backup software targeted to perform the request includes a signature associated with training data, and program instructions to, in response to determining that the backup software targeted to perform the received request has a signature in the associated training data, execute one or more actions, where the one or more actions comprise: program instructions to authenticate a user and an internet protocol (IP) address originating the request, and program instructions to calculate a risk, associated with the user, based on employee information associated with the user. Such an aspect of the invention has a technical advantage of protecting storage controller vulnerabilities during back up operations by detecting and preventing backup and restore anomalies to any type of storage (e.g., Universal Serial Bus (USB), Box, USB clouds, NAS drive, cloud storage, etc.).

In embodiments, the computer system can further comprise program instructions to, in response to the risk associated with the user meeting requirements for low risk, authorize the request to execute the backup operation. Such an aspect of the invention has a technical advantage of adding an extra layer of security when accessing storage area network (SAN) controller.

In embodiments, the computer system where the program instructions to execute one or more actions can further comprise program instructions to verify that the backup operation does not violate legal policies and program instructions to verify that the backup operation does not violate cybersecurity policies. Such an aspect of the invention has a technical advantage of adding an extra layer of security when accessing storage area network (SAN) controller.

In embodiments, the computer system can include that the signature is located in one or more of locations comprising previous backups and publicly available databases. such an aspect of the invention has a technical advantage of ensuring all training data has a known signature that can be referenced for future uses.

In embodiments, the computer system can include that the employee information comprises employee user identity, employee name, employee function, previous predetermined time employee read/write access, corporate directory, and employee information. Additionally or alternatively, an embodiment in which executes one or more actions has a technical advantage of providing an additional layer of backup authentication based on employee information.

In embodiments, the computer system can include that the IP information associated with the IP address comprises internal IP structure information, internal IP low level details, employee IP specific information, and well-known corporate backup/restore IP address. Additionally or alternatively, an embodiment in which executes one or more actions has a technical advantage of providing an additional layer of backup authentication based on IP information.

Embodiments of the present invention recognize that data security focuses on threat detect and prevention of unauthorized access of data. Typically, the majority of cyber threat detection and efforts have largely been Wide Area Network (WAN) and/or Local Area Network (LAN) related. While some solutions focus on Storage Area Network and connected devices, embodiments of the present invention recognize certain deficiencies with Storage Area Network (SAN) security solutions. Embodiments of the present invention recognize that current SAN solutions lack security measures for back up and/or restore operations. For example, if an unauthorized user gains access to a SAN controller (e.g., where unauthorized user is attempting to access backup/restore files), current solutions provide little to no controls on where backup and/or restore operations can be performed. Once an authorized user gains access to a SAN controller, the entire storage controller is effectively vulnerable.

Embodiments of the present invention provide solutions for protecting storage controller vulnerabilities during back up operations. For example, embodiments of the present invention can detect and prevent backup and restore anomalies to any type of storage (e.g., Universal Serial Bus (USB), Box, USB clouds, NAS drive, cloud storage, etc.). More specifically, embodiments of the present invention can utilize historical data that is processed using advanced analytics to determine backup and/or restore software, authenticate a backup request, and determine a level of risk of performing the backup request, as discussed in greater detail later in this Specification.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access storage security manager 110 (e.g., using TCP/IP) to access user information and database information. Application 104 can further communicate with storage security manager 110 to determine backup and/or restore software, authenticate a backup request, and determine a level of risk of performing the backup request, as discussed in greater detail in FIGS. 2-5.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts storage security manager 110 and database 112. In this embodiment, storage security manager 110 resides on server computer 108. In other embodiments, storage security manager 110 can have an instance of the program (not shown) stored locally on client computing device 102. In other embodiments, storage security manager 110 can be a standalone program or system that can be integrated in one or more computing devices having a display screen.

Storage security manager 110 improves security of SAN controllers during a backup request operation. In this embodiment, storage security manager 110 includes an analytics engine (not shown) and a recommendation database (also not shown) that are used to determine risks associated with performing a received backup request as discussed in greater detail with regard to FIG. 2. Storage security manager 110 improves security of SAN controllers during a backup request operation using historical data to determine backup and/or restore software, authenticate a backup request, determine a level of risk of performing the backup request, and prevent backup and restore anomalies. In other words, storage security manager 110 can improve security of SAN controllers during a backup/restore operation request by authenticating a user and an Internet Protocol (IP) address originating the request. For example, storage security manager 110 can validate a backup/restore operation adheres to defined policy by determining if backup/restore software targeted to perform the request has a signature in associated training data in response to receiving a request to execute a backup/restore operation. Responsive to the associated training data having a signature, storage security manager 110 can execute one or more actions for risk determination such as authenticating a user and an internet protocol (IP) address originating the request, calculating a risk, associated with the user, based on employee information associated with the user, verify that the backup/restore does not violate legal policies, and verify that the backup/restore does not violate cybersecurity policies. In this manner, storage security manager 110 applies intrusion detection techniques to detect and stop suspicious activity in storage area networks which helps protect backup copies of data.

Based on those actions (e.g., for risk determination), storage security manager 110 can perform one or more ameliorative actions based on the determined risk. For example, storage security manager 110 can either authorize the request to execute a backup/restore or prevent the execution of the request to perform the backup restore. In some embodiments, storage security manager 110 can flag a received request for manual verification and authorization and can generate a report that includes identified risks and respective metadata (e.g., IP address associated with the request, employee information, type of request being made (e.g., backup/restore operation), version software being accessed, database accessed, timestamps associated with performed actions, and other relevant information).

Database 112 stores received information and can be representative of one or more databases that give permissioned access to storage security manager 110 or publicly available databases. For example, database 112 can store known and good backup and restore locations of data (e.g., other storage device configured, or user provided), internal department or organization information (e.g., permissioned access of an internal web resource), internal IP address assignment (e.g., tools that help manage lab resources in your testing labs by providing a way to track your resources and administer lab-resource reservations and requests), known IP addresses determined to be acceptable, company policies (e.g., USB drives allowed or permissioned access), company device databases (e.g., tools such as a server security compliance assistant), and any other sources of information. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
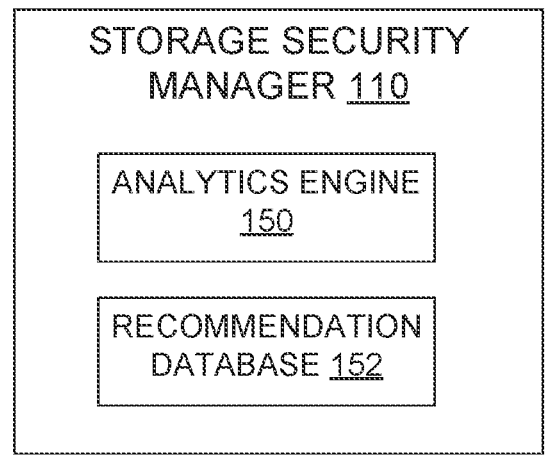
FIG. 2 depicts a block diagram of certain components of a storage security manager, in accordance with an embodiment of the present invention.

FIG. 2 depicts a block diagram of certain components of a storage security manager, in accordance with an embodiment of the present invention.

Storage security manager 110 includes analytics engine 150 and recommendation database 152 that are used to determine risks associated with performing a received backup request. Analytics engine 150 accesses training data and performs analysis that determines risks associated with a received request to perform a backup request or restore operation. Effectively, analytics engine 150 detects and prevents backup and restore anomalies that are flagged as suspicious and takes appropriate action.

In this embodiment, analytics engine 150 ingests training data from database 112. Training data can include various data sources such as registered or otherwise authorized backup and restore locations of data (e.g., other storage device configured, or user provided). Training data can also include security monitoring tool output (not shown) that are used to detect external and internal security threats and can be leveraged to detect and flag suspicious behavior. Training data can also include internal information sources (e.g., employee databases that can include employee user IDs), sever databases, network data usage information, IP address allocation/layout (e.g., site specific IP address databases as well as corporate IP address databases), and other registered and known IP addresses (e.g., company preferred backup/restore programs that are assigned an IP address by a network admin that are included in the site IP address database and/or the corporate IP address database.

Analytics engine 150 determines risks associated with performing a received backup request by ensuring all backup/restore software has a signature in the training data and authenticating the received backup request. A "signature" as used herein, refers to a specific data pattern (e.g., typically one or more headers that describes the backup/restore data) associated with a specific version of backup/restore software. In certain instances, where a signature is unknown (i.e., not yet added to a database of known signatures), analytics engine 150 can create a signature by comparing the data that is actually written/read to or from a device to the contents of a known data file that was backed up and restored. The differences between the actual data and the data read or written to/from the media becomes the backup/restore software's signature. In this embodiment, the signature typically contains one or more headers that describe in detail the backup and restore data.

Figure 3:
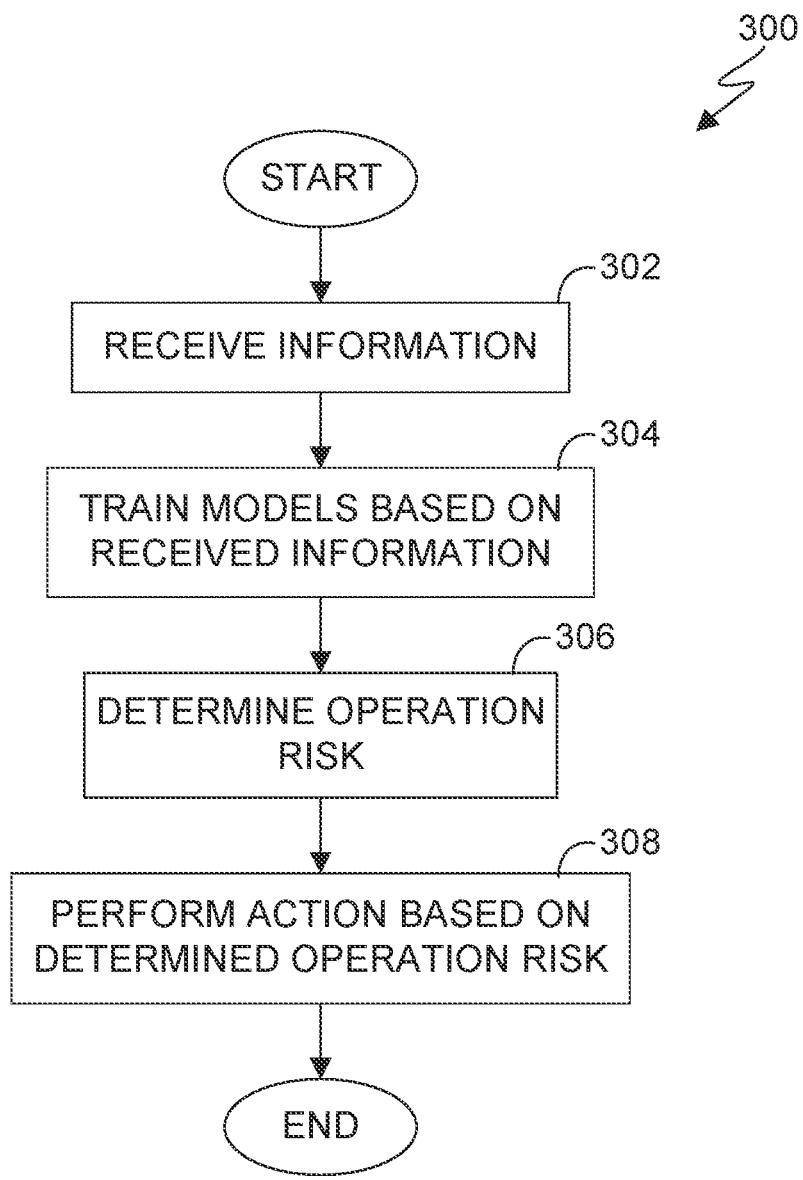
FIG. 3 is a flowchart depicting operational steps for performing a security action based on determined operation risk, in accordance with an embodiment of the present invention.
Figure 4:
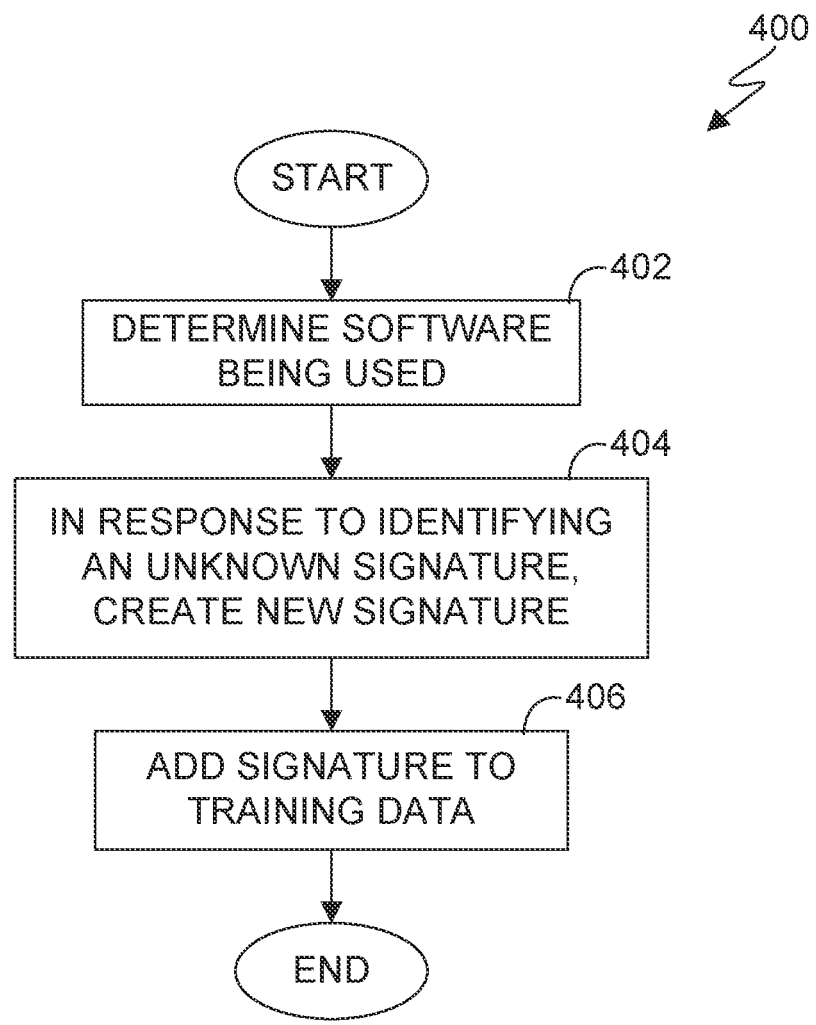
FIG. 4 is a flowchart depicting operational steps for ensuring backup software has a signature in received training data, in accordance with an embodiment of the present invention.
Figure 5:
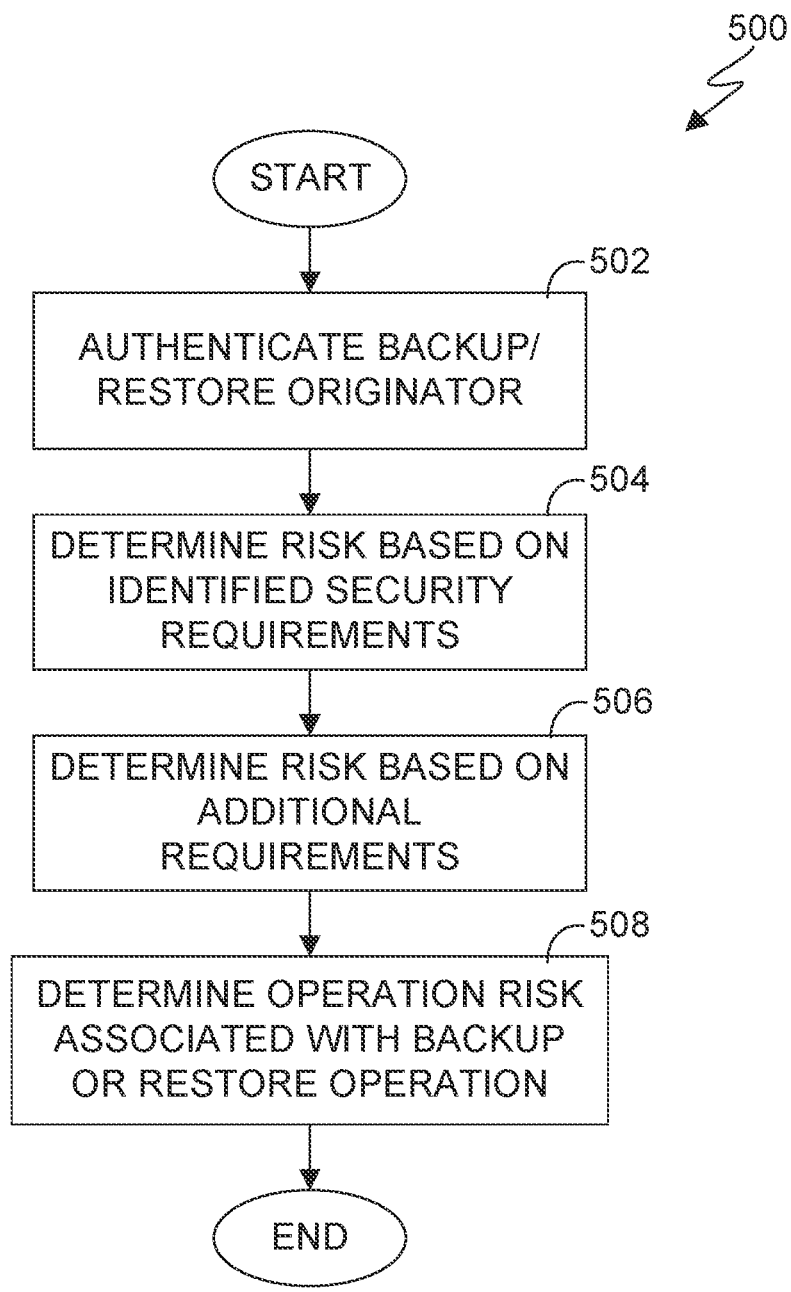
FIG. 5 is a flowchart depicting operational steps for determining an operation risk associated with a backup request, in accordance with an embodiment of the present invention.

Analytics engine 150 can authenticate the received backup request by authenticating the received backup/restore originator, determining the risk of performing the backup restore operation using the requestor's internal information, determining additional requests (e.g., legal policy, external requirements), and determining whether the level of risk associated with performing the backup or restore operation as described in greater detail with respect to FIGS. 3-5.

Analytics engine 150 assigns or otherwise generates (i.e., calculates) a score representing a level of risk that is used in the recommendation database to determine the risk associated with performing the received backup/restore operation. In this embodiment, analytics engine 150 uses a numeric scale from zero to one hundred, where lower numbers indicate a lesser risk and higher numbers indicate a greater risk. Analytics engine 150 can then take an action based on the assigned scored. Analytics engine 150 uses an initial score of zero and increases or otherwise modifies the initial score based on a number of risk factors it encounters. A risk score of zero to twenty indicates a low level of risk. In this embodiment, analytics engine 150 triggers a manual investigation if the assigned score ranging from twenty to ninety indicating a medium level of risk. In this embodiment, analytics engine 150 prevents the backup/restore operation if the score is within the range of ninety to one hundred (i.e., ninety-one to one hundred which indicates a high level of risk). In other embodiments, any scale and numeric range can be used.

Recommendation database 152 stores the generated score from analytics engine 150. In general, database 112 can be implemented using any non-volatile storage media known in the art. For example, database 112 can be implemented with a tape library, optical library, one or more independent hard disk drives, or multiple hard disk drives in a redundant array of independent disk (RAID).

FIG. 3 is a flowchart 300 depicting operational steps flowchart depicting operational steps for performing a security action based on determined operation risk, in accordance with an embodiment of the present invention.

In step 302, storage security manager 110 receives information. In this embodiment, received information includes training data from database 112. In this embodiment, training data can include backup software signatures (e.g., employee user IDs, names, job function, amount of data read and/or written during a given time period, corporate directory, department information, other employee information etc.), Internet Protocol (IP) information (e.g., internal IP structure of an organization, internal IP low level details such as a sub-net, employee specific information associated with IP addresses, and well known or registered backup or restore IP addresses such as a companywide location), legal policies (e.g., applicable legal policies of country, state such as General Data Protection Regulations (GDPR), consumer privacy and protection, health and safety, etc.), company policies (e.g., rules such as a mandate against copying intellectual property, restricted data, personal data, classification of data on server from a specific location, data classification based on company specific stored location, etc.), potential cyber risk areas (e.g., personnel records and status, at risk devices (e.g., USB devices, computer systems, etc.), known cyber security threats such as lateral movements from one server to another, data being backed up being substantially different than previous backups, such as all zeros or all ones, internal monitoring tools output data, etc.), and explicit exception permissions granted to backup or restore specific data (e.g., employee granted permission authorized by a recognized authority such as management or security, and/or blanket corporate permissions for backup/restore applications). In other embodiments, training data can be received from one or more other components of computing environment 100.

In step 304, storage security manager 110 trains one or more models based on the received information. In this embodiment, storage security manager 110 trains one or more machine learning or artificial intelligence algorithms to determine backup/restore operation risk for a received request to perform a backup/restore operation. In this embodiment, storage security manager uses known and good backup and restore locations of data (e.g., other storage device configured, or user provided), internal department or organization information (e.g., permissioned access of an internal web resource), internal IP address assignment (e.g., tools that help manage lab resources in your testing labs by providing a way to track your resources and administer lab-resource reservations and requests), known IP addresses determined to be acceptable, company policies (e.g., USB drives allowed or permissioned access), company device databases (e.g., tools such as a server security compliance assistant), and any other sources of information as training data.

In step 306, storage security manager 110 determines an operation risk. In this embodiment, storage security manager 110 continually monitors for a requested backup or restore operation. In response to receiving a request for a backup or restore operation, storage security manager 110 determines an operation risk by authenticating the requestor based, at least in part, on internal information, IP address, and security regulations and a determined operation risk associated with performing the backup or restore operation based on device type, monitoring tools, and assigned risk score, as discussed in greater detail with respect to FIG. 3.

In step 308, storage security manager 110 performs an action based on the determined operation risk. In this embodiment storage security manager 110 performs an action based on the assigned risk score. As mentioned earlier, storage security manager 110 uses a numeric scale from zero to one hundred, where lower numbers indicate a lesser risk and higher numbers indicate a greater risk. In this embodiment, storage security manager 110 uses three numeric ranges that inform the action storage security manager 110 takes. For example, an assigned score (e.g., created score) of zero to twenty would indicate a "no risk" to "low level risk". An assigned score of greater than twenty to ninety would indicate a "medium risk". An assigned score of greater than ninety to one hundred indicates a high operation risk.

Storage security manager 110 can then perform an action based on the determined risk. In instances where storage security manager 110 determines no risk or a low-level risk for a requested operation, storage security manager 110 performs the action (e.g., performs the backup operation or requested restore operation). In other words, in response to the risk associated with the user meeting requirements for a low-level risk (i.e., low risk), storage security manager 110 can authorize the request to execute the backup/restore operation. In instances where storage security manager 110 determines a medium risk, storage security manager 110 triggers a manual verification for a change. In this embodiment, storage security manager 110 can flag the medium risk and generate and subsequently send a message for manual verification. In response to receiving input from a manual verification, storage security manager 110 can either perform the requested action or prevent the requested action. Finally, where storage security manager 110 determines a high risk associated with the requested operation, storage security manager 110 denies the requested operation and prevents the operation (e.g., prevents backup or restore operation). In other words, in response to the risk associated with the user meeting requirements for a high-level risk (i.e., high risk), storage security manager 110 can deny the requested operation and prevents the operation. In certain embodiments, storage security manager 110 can then generate a report detailing the requested operation, identified IP addresses, and subsequently send the generated report to an authorized user. In certain instances, storage security manager 110 can lock out or otherwise prevent further inputs or requests from the computing device associated with the high risk.

FIG. 4 is a flowchart 400 depicting operational steps for ensuring backup software has a signature in received training data, in accordance with an embodiment of the present invention.

In step 402, storage security manager 110 determines software being used. In this embodiment, storage security manager 110 determines the software being used using a combination of one or more natural language processing algorithms to identify header information from a received request. In other embodiments, storage security manager 110 can query the requesting program for software information. Software information can include program name, version number, and type of request. In other embodiments, software information can include additional metadata. An example of a backup/restore header (i.e., signature) is reproduced below in Table 1.

TABLE 1

| | | Header Information | |
|---|---|---|---|
| Field | Field Header | Example | Description |
| 1 | Record Header | Image | |
| 2 | Client Name | Myclient | The name of client being backed up |
| 3 | Date1 | 0 | |
| 4 | Date2 | 0 | |

TABLE 1-continued

Header Information

| Field | Field Header | Example | Description |
|---|---|---|---|
| 5 | Version | 7 | The version id of the image format 7 = Netbackup 5.0-6.0, 8 = NetBackup 6.5-7.1, 9 = Netbackup 7.5 and later |
| 6 | Backup ID | Myclient_1115034756 | The BackupID recorded in the Image Database |
| 7 | Class Name | Mypolicy | The name of the policy associated with this backup |
| 8 | Client type | 13 | The type of client: 0 = STANDARD, 1 = Proxy, 2 = NONSTANDARD, 3 = APOLLO_WBAK, 4 = ORACLE, 6 = INFORMIX, 7 = SYBASE, 8 MAC, 9 WINDOWS, 10 = NETWARE, 11 = BACKTRACK, 12 = AUSPEX FASTBACKUP, 13 = WINDOWS NT, 14 = 0S2, 15 = SQL SERVER, 16 = EXCHANGE |
| 9 | Proxy Client | *NULL* | |
| 10 | Creator | root | The user who stared the backup |
| 11 | Schedule Label | Incr_bkup | The name of the schedule that wrote the original backup |
| 12 | Schedule Type | 1 | The type of schedule: 0 = Full, 1 = Differential Incremental, 2 = User Backup, 3 = User Archive, 4 = Cumulative Incremental, 5 = Archived redo log backup (only with OIP) |
| 13 | Retention Level | 3 | The Retention Level of the backup: 0-24 (usebpretlevel-|to see the Retention Period that corresponds to the Retention Level). |
| 14 | Backup Time (Image Directory Name) | 1115034756 | The time that the backup started. This is a Unix time value (number of seconds since Jan. 1, 1970). Use bpdm -ctime to get date and time |

In step 404, storage security manager 110 in response to identifying an unknown signature, creating a new signature. In this embodiment, storage security manager 110 creates a new signature in response to identifying an unknown signature that was previously not stored in an accessible database of known signatures (e.g., database 112). Storage security manager 110 creates or otherwise registered the unknown signature by starting a backup/restore of a known data file and identifying the differences between the known data file and the data captured on the wire. Storage security manager 110 uses the identified differences as the backup/restore software's signature.

In step 406, storage security manager 110 adds the signature to training data. In this embodiment, storage security manager 110 adds the created signature to the training data stored on database 112. Additionally, storage security manager 110 saves the requestor's and responder's identifiers (e.g., IP addresses, N_port IDs, etc.).

In this manner, storage security manager 110 can identify and ensure signatures are known of software being used to perform a backup/restore operation. Storage security manager 110 can iteratively perform steps 402-406 to add software signatures to training data.

FIG. 5 is a flowchart 500 depicting operational steps for determining an operation risk associated with a backup request, in accordance with an embodiment of the present invention.

In step 502, storage security manager 110 authenticates the backup/restore originator. In other words, storage security manager 110 authenticates the user associated with the request. In this embodiment, storage security manager 110 authenticates the backup/restore originator based on the requestor's userID, known IP Address, and whether the IP address associated with the requestor matches an internal IP structure. For example, storage security manager 110 may initially start with an assigned score of zero. In response to determining the requestor (i.e., user transmitting a backup or restore operation) is an employee using a valid employee userID, storage security manager 110 determines the requestor is not a security risk and keeps the assigned score of zero. In instances where storage security manager 110 determines that the requestor is not using a known or otherwise valid userID, storage security manager 110 can assign a score of one hundred that indicates a high risk. In instances where storage security manager 110 determines a high risk associated with the requested operation, storage security manager 110 denies the requested operation and prevents the operation (e.g., prevents backup or restore operation). Storage security manager 110 can then terminate processing of the received request.

In response to determining that the user has inputted valid credentials (e.g., a valid employee userID), storage security manager 110 can then determine the IP address associated with the request. Storage security manager 110 can then assign a score of zero for a known employee IP address which indicates no risk or assign a score of thirty for an unknown IP Address (e.g., where policy does not require the user to use a specific IP address, but policy does specify that an internal IP Address must be used).

In instances where there is a policy that IP addresses must match an internal IP structure (e.g., company policy requires that a company IP address must be used), storage security manager 110 can identify the IP address associated with the request and compare the identified IP address to known or otherwise approved IP addresses. In response to determining that the IP address does not match the internal IP structure, storage security manager 110 can assign a value of one hundred to indicate that there is a high risk and can accordingly terminate processing of the received request.

In other embodiments, storage security manager 110 can be configured to have varying thresholds for each factor checked. For example, where a user inputs credentials having a typographical error, storage security manager 110 can delay termination of the request until storage security manager 110 can verify the user's credentials in another manner. For example, storage security manager 110 can be configured with a threshold number of attempts (e.g., three tries at inputting valid user credentials before terminating the received request. In other embodiments, storage security manager 110 can provide alternate methods for authenticating the backup/restore credentials (e.g., using a known employee IP address or having an IP address that matches an internal IP structure).

In step 504, storage security manager 110 determines risk based on identified security requirements. In this embodiment, identified security requirements refers to credentials associated with the requestor (e.g., certain permissions to backup or restore data of a certain data classification). Identified security requirements can also refer to the requestor's internal employee information such as classifications of whether the user is the data owner, whether the data being backed up belongs to the user's department.

Storage security manager 110 can then assign a score to each of the identified and applicable security requirements. For example, in response to determining that the user requesting the backup operation is the data owner, storage security manager 110 can assign a risk value of one. In this embodiment, where storage security manager 110 determines that the user requesting the backup operation is not the data owner, storage security manager 110 assigns a risk value of ten (e.g., in instances where policy requires additional verification before a backup/restore operation is allowed) based on identified security requirements. In other embodiments, storage security manager 110 can be configured to assign a different weighted value based on user requirements (e.g., based on different company policies).

Storage security manager 110 can similarly assign a value of one in response to determining that the data belongs to the user's department. Conversely, storage security manager 110 can assign a risk score of ten in response to determining that the user requesting the backup operation does not belong to the user's department.

Storage security manager 110 can then determine whether the user is allowed to backup or restore data having a certain type of data classification. In this embodiment, storage security manager 110 can leverage secure cloud service architecture (SSCA) to determine data classification. In response to determining that the employee is allowed to backup or restore data having a specific type of data classification, storage security manager 110 assigns a risk score of one. In response to determining that the employee is not allowed to backup or restore data having a specific type of data classification, storage security manager 110 assigns a risk score of one hundred to indicate high risk (e.g., where policy prevents backup/restore operations of users not having credentialed or otherwise permissioned access to backup or restore data associated with a specific data classification that the user is attempting to backup or restore).

In instances where the user has been granted an explicit exception permission to backup or restore the type of data that the user normally does not have access to, storage security manager 110 assigns a risk score of one. Conversely, storage security manager 110 assigns a risk score of one hundred to indicate a high risk in response to determining that the employee does not have an explicit exception permission to backup or restore the type of data that the user would not have access to.

In step 506, storage security manager 110 determines risk based on additional requirements. In this embodiment, additional requirements can refer to specific legal policies or provisions. Authorized users can configure which additional requirements storage security manager 110 checks before performing a backup/restore operation. For example, storage security manager 110 can assign scores based on General Data Protection Regulations (GDPR), consumer privacy and protection, health and safety, company policies, etc. For example, storage security manager 110 can, in response to determining that an additional requirement (e.g., GDPR, consumer privacy, health and safety) is not compliant with the additional requirements, assign a risk score of one hundred to indicate a high risk and take appropriate action (e.g., prevent backup or restore operations associated with the received request).

In step 508, storage security manager 110 determines an operation risk associated with backup or restore operation. In this embodiment, storage security manager 110 determines an operation risk associated with a backup or restore operation by adding the previous assigned risk scores and determine whether there is a no risk, low-level risk, medium risk, or a high risk associated with received request.

As mentioned, storage security manager 110 determines no risk or a low-level risk for a requested operation for scores totaling from zero to twenty. Storage security manager 110 determines a medium risk for a requested operation when scores total greater than twenty to ninety and determines a high risk for a requestion operation when scores total greater than ninety.

In this embodiment, storage security manager 110 can further determine backup/restore risk using data output from an organization's security monitoring tools. For example, storage security manager 110 can query an organization's security monitoring tool for additional information to identify any suspicious behavior that could be associated with a known security risk and add additional risk score values based on received information from the security monitoring tool. For example, storage security manager 110 can query the organizations security monitoring tools to identify whether any behavior associated with a known security risk for the user transmitting a backup/restore operation request or whether the security monitoring tool has detected any suspicious or otherwise abnormal behavior from the user transmitting the request. Storage security manager 110 can also access databases containing known cybersecurity vulnerabilities information for additional information and adjust risk score values based on any other identified security vulnerabilities.

For example, storage security manager 110 can additionally check backup/restore devices. Specifically, storage security manager 110 can assign a risk score of one if the device is registered or otherwise permitted. Conversely, where the device is not registered or otherwise not permitted (e.g., USB device), storage security manager 110 can assign a risk score value of one hundred which indicates a high-risk score. Storage security manager 110 can then prevent the backup/restore operation.

In instances where storage security manager 110 leverages the organization's security monitoring tool, storage security manager 110 can adjust the risk score based on information provided by the security monitoring tool. For example, where the security monitoring tool indicates it has identified the requestor as performing suspicious or otherwise not normal activity, storage security manager 110 can assign a risk score value of one hundred. Conversely, storage security manager 110 can assign a risk score value of one in response to determining that the security monitoring tool indicates the requestor has not been flagged as performing abnormal behavior.

Finally, storage security manager 110 can assign a risk score based on determining whether the data being backed up or restored is being backed up or restored to a location that has not been used before. In response to determining that the data being backed up or restored is being backed up or restored to a location that has not been used before, storage security manager 110 can assign a risk score of seventy-five which indicates a medium risk. Storage security manager 110 can then flag the medium risk for manual risk verification before performing the backup/restore operation. In response to determining the data being backed up or restored is being backed up or restored to a location that has been used before, storage security manager 110 can assign a risk score of zero indicate no risk.

Figure 6:
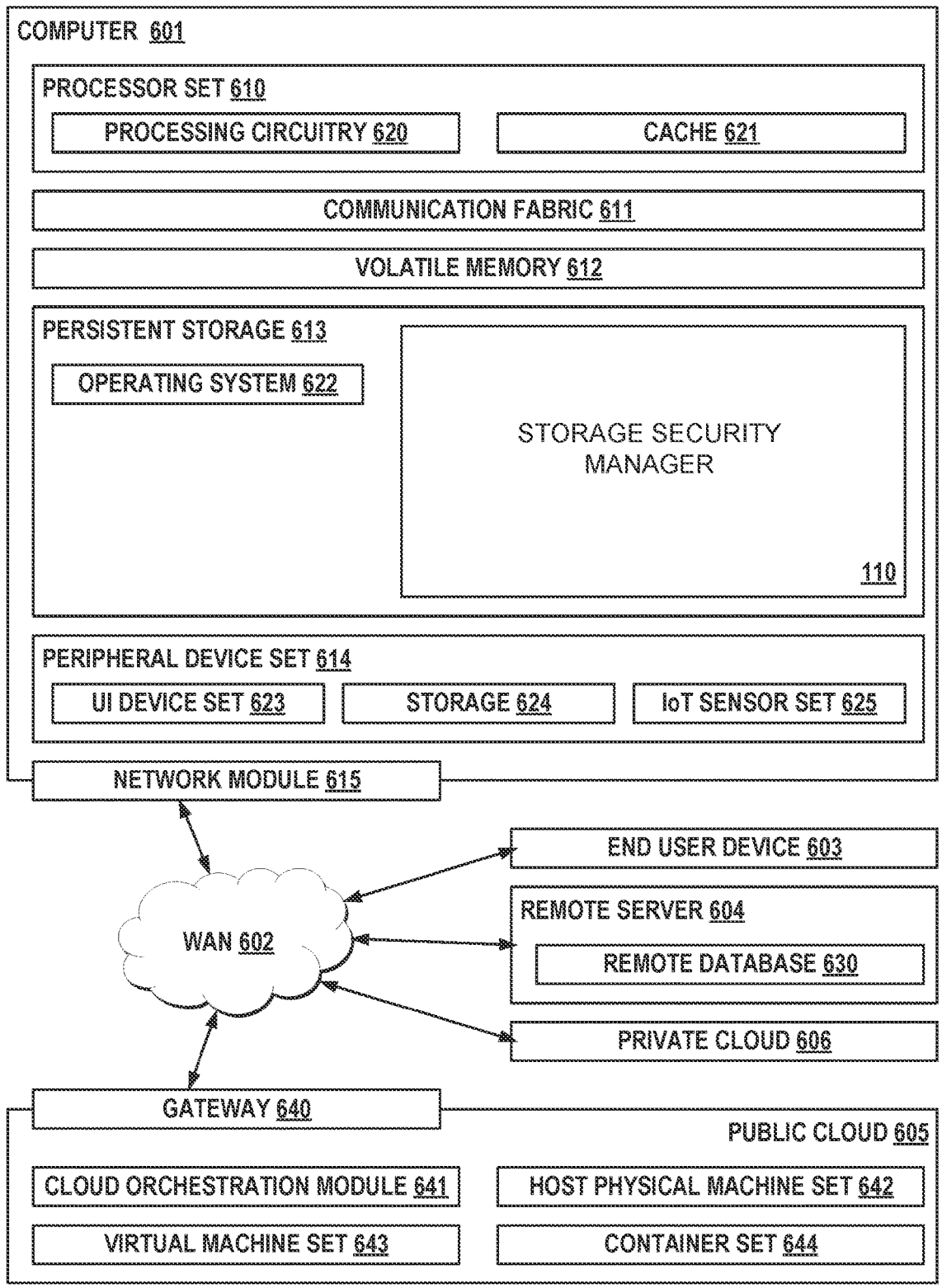
FIG. 6 is a block diagram of an alternate computing environment, in accordance with an embodiment of the present invention.

FIG. 6 depicts an alternate block diagram of components of computing systems within computing environment 100 of FIG. 1, in accordance with an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as storage security manager 110 (also referred to as block 110) dynamically aggregates records for long transactions by generating a mechanism (e.g., an execution slot) to exclude identified performance data of long transactions from current aggregation, store the excluded performance data in memory, and subsequently retrieve the performance data as discussed previously with respect to FIGS. 2-5.

In addition to block 110, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 110, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 110 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 110 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

What is claimed is:

1. A computer-implemented method comprising:
   in response to receiving a request to execute a backup operation, determining that backup software targeted to perform the request includes a signature associated with training data; and
   in response to determining that the backup software targeted to perform the received request has a signature in the associated training data, executing one or more actions, wherein the one or more actions comprise:
      authenticating a user and an internet protocol (IP) address originating the request; and
      calculating a risk, associated with the user, based on employee information associated with the user.

2. The computer-implemented method of claim 1, further comprising:
   in response to the risk associated with the user meeting requirements for low risk, authorizing the request to execute the backup operation.

3. The computer-implemented method of claim 1, wherein the one or more actions further comprise:
   verifying that the backup operation does not violate legal policies; and
   verifying that the backup operation does not violate cybersecurity policies.

4. The computer-implemented method of claim 1, wherein the signature is located in one or more of locations comprising previous backups and publicly available databases.

5. The computer-implemented method of claim 1, wherein the employee information comprises employee user identity, employee name, employee function, previous predetermined time employee read/write access, corporate directory, and employee information.

6. The computer-implemented method of claim 1, wherein IP information associated with the IP address comprises internal IP structure information, internal IP low level details, employee IP specific information, and well-known corporate backup/restore IP address.

7. The computer-implemented method of claim 1, further comprising:
   in response to determining that backup software targeted to perform the received request does not a signature in the associated training data, identifying known differences between a known datafile and data captured as the signature of the backup software.

8. A computer program product comprising:
   one or more computer readable storage media and program instructions stored on the one or more computer readable storage media, the program instructions comprising:
      program instructions to, in response to receiving a request to execute a backup operation, determining that backup software targeted to perform the request includes a signature associated with training data; and
      program instructions to, in response to determining that the backup software targeted to perform the received request has a signature in the associated training data, executing one or more actions, wherein the one or more actions comprise:
         program instructions to authenticate a user and an internet protocol (IP) address originating the request; and
         program instructions to calculate a risk, associated with the user, based on employee information associated with the user.

9. The computer program product of claim 8, wherein the program instructions stored on the one or more computer readable storage media further comprise:
  program instructions to, in response to the risk associated with the user meeting requirements for low risk, authorize the request to execute the backup operation.

10. The computer program product of claim 8, wherein the one or more actions further comprise:
  program instructions to verify that the backup operation does not violate legal policies; and
  program instructions to verify that the backup operation does not violate cybersecurity policies.

11. The computer program product of claim 8, wherein the signature is located in one or more of locations comprising previous backups and publicly available databases.

12. The computer program product of claim 8, wherein the employee information comprises employee user identity, employee name, employee function, previous predetermined time employee read/write access, corporate directory, and employee information.

13. The computer program product of claim 8, wherein IP information associated with the IP address comprises internal IP structure information, internal IP low level details, employee IP specific information, and well-known corporate backup/restore IP address.

14. The computer program product of claim 8, wherein the program instructions stored on the one or more computer readable storage media further comprise:
  program instructions to, in response to determining that backup software targeted to perform the received request does not a signature in the associated training data, identify known differences between a known datafile and data captured as the signature of the backup software.

15. A computer system comprising:
  one or more computer processors;
  one or more computer readable storage media; and
  program instructions stored on the one or more computer readable storage media for execution by at least one of the one or more computer processors, the program instructions comprising:
    program instructions to, in response to receiving a request to execute a backup operation, determining that the backup software targeted to perform the request includes a signature associated with training data; and
    program instructions to, in response to determining that backup software targeted to perform the received request has a signature in the associated training data, executing one or more actions, wherein the one or more actions comprise:
      program instructions to authenticate a user and an internet protocol (IP) address originating the request; and
      program instructions to calculate a risk, associated with the user, based on employee information associated with the user.

16. The computer system of claim 15, wherein the program instructions stored on the one or more computer readable storage media further comprise:
  program instructions to, in response to the risk associated with the user meeting requirements for low risk, authorize the request to execute the backup operation.

17. The computer system of claim 15, wherein the one or more actions further comprise:
  program instructions to verify that the backup operation does not violate legal policies; and
  program instructions to verify that the backup operation does not violate cybersecurity policies.

18. The computer system of claim 15, wherein the signature is located in one or more of locations comprising previous backups and publicly available databases.

19. The computer system of claim 15, wherein the employee information comprises employee user identity, employee name, employee function, previous predetermined time employee read/write access, corporate directory, and employee information.

20. The computer system of claim 15, wherein IP information associated with the IP address comprises internal IP structure information, internal IP low level details, employee IP specific information, and well-known corporate backup/restore IP address.

* * * * *